Oct. 9, 1934.  E. W. DILG  1,976,058
METHOD OF PRODUCING BEARINGS
Filed May 16, 1932   2 Sheets-Sheet 2
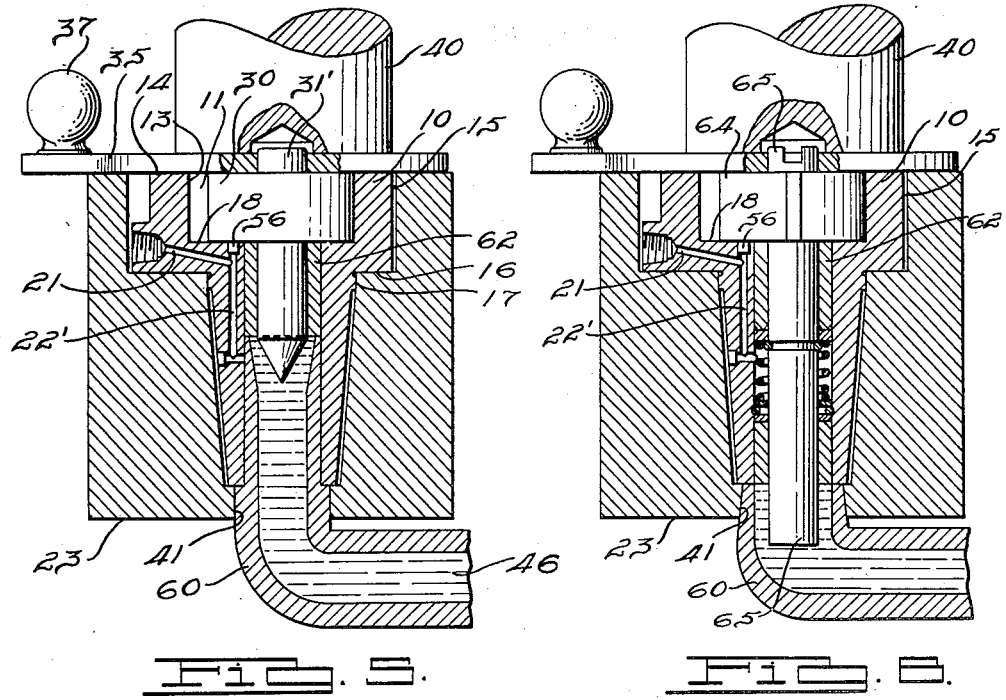
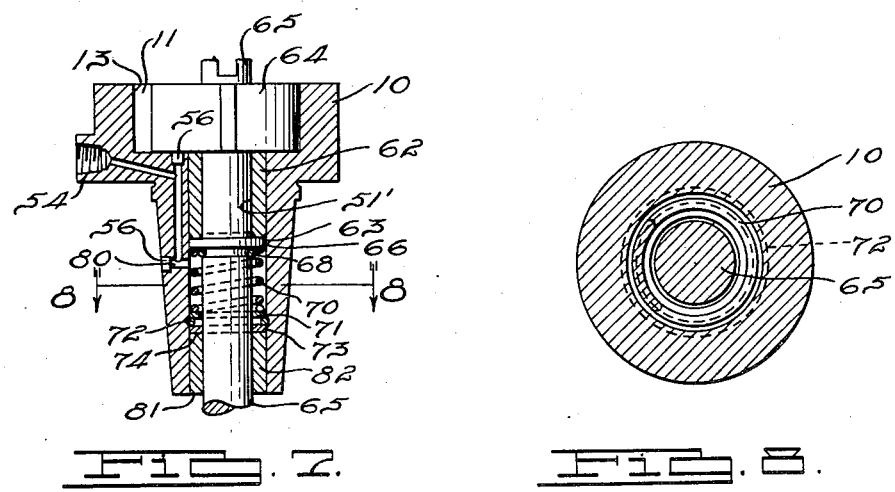
INVENTOR
*Earl W. Dilg.*
BY
*Harness, Dickey, Pierce and Hann*
ATTORNEYS.

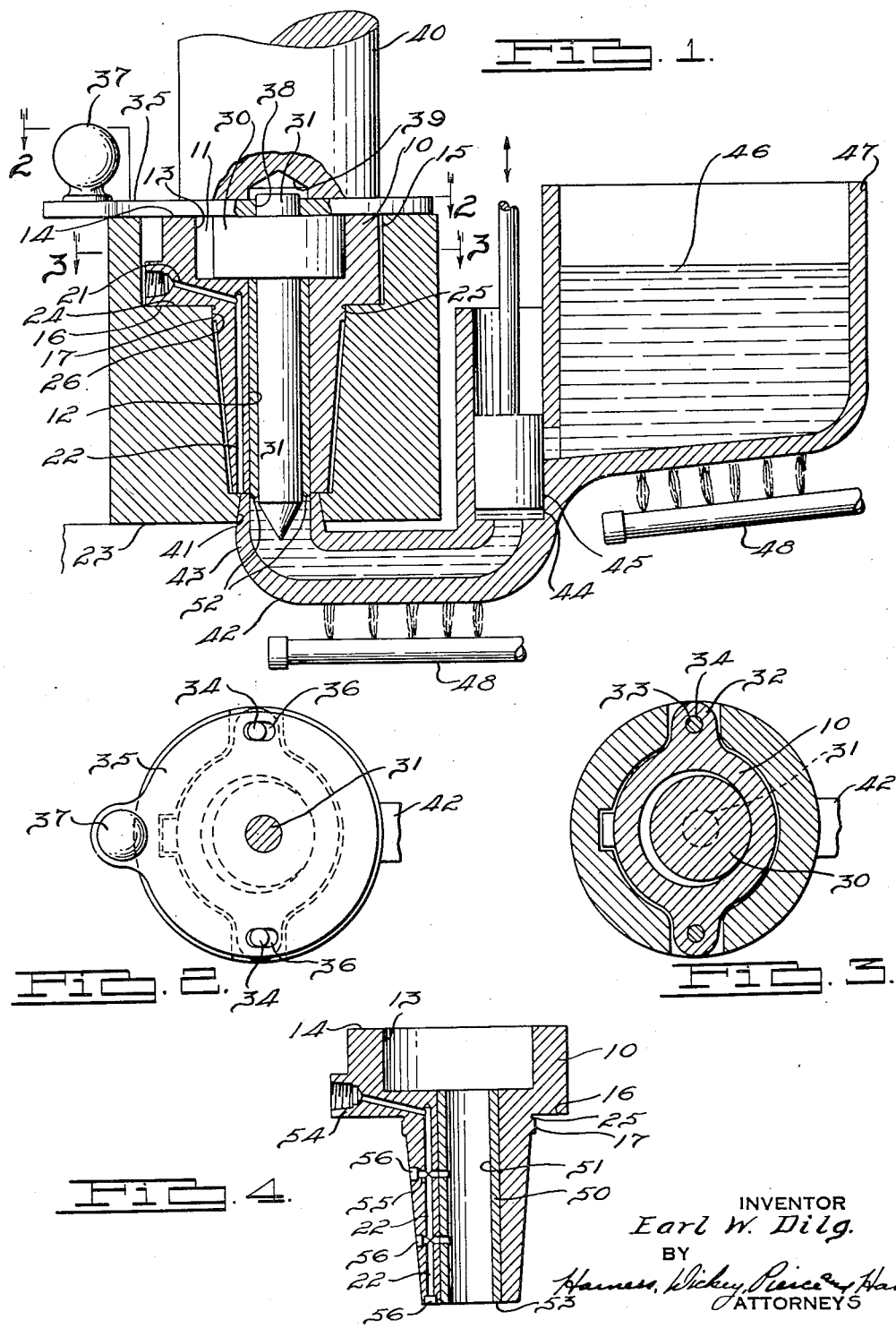

Patented Oct. 9, 1934

1,976,058

UNITED STATES PATENT OFFICE 1,976,058

METHOD OF PRODUCING BEARINGS

Earl W. Dilg, Detroit, Mich., assignor to Evans Appliance Company, a corporation of Michigan Application May 16, 1932, Serial No. 611,532

2 Claims. (Cl. 29—149.5)

This invention relates to rotary pumps in which a rotor is mounted within and eccentrically disposed with respect to a generally cylindrical pumping chamber, the rotor carrying means which cooperates with the peripheral wall of the pumping chamber to effect pumping action. The invention relates more especially to the fabrication of bearings for the rotors of pumps of the above type and has for its principal object to provide for an improved method for producing these bearings.

Another object of the invention is to provide a method of forming a bearing which insures a perfect bearing surface, free from machining and grinding marks.

Another object is to provide a method of forming a bearing for the shaft of pump rotor such that the bearing formed correctly aligns the rotor with respect to the casing which provides the pumping chamber therefor.

A further object is to provide a method for forming a bearing for the shaft of a pump rotor which insures proper clearance between the rotor and the periphery of the pumping chamber therefor.

Other objects and advantages will become apparent from the following description taken in connection with the accompanying drawings, in which:—

Fig. 1 is a central sectional view of an apparatus, more-or-less diagrammatically arranged, for producing a bearing according to the method employed in this invention;

Figs. 2 and 3 are sections taken along the lines 2—2 and 3—3 respectively, of Fig. 1;

Fig. 4 is a central sectional view of a pump casing in final form as constructed according to the present method;

Figs. 5 and 6 are fragmentary views similar to Fig. 1 showing steps employed in constructing another type of bearing for a pump shaft;

Fig. 7 is a view similar to Fig. 4, of a completed bearing and casing constructed in accordance with the method indicated in Figs. 5 and 6; and Fig. 8 is an enlarged section taken on the line 8—8 of Fig. 7.

Referring particularly to Figs. 1 to 4 inclusive, the method of preparing a casing and oil seal bearing therefor will be described.

According to this method, a casing member 10 is cast to the approximate form desired so as to provide a recess 11 and a longitudinally disposed opening 12 therein with their axes parallel but spaced from one another to provide the desired eccentricity between the longitudinal opening 12 and recess 11. The diameter of opening 12 is considerably greater than the diameter of the rotor shaft to be disposed therein to provide space for the bearing for said rotor shaft. The surfaces 13, 14, 15, 16, 17 and 18 of casing 10 are then machined to shape the cylindrical recess 11 to the desired form and to provide means for aligning the casing 10 relative to a support. Interconnecting oil passages 21 and 22 may be drilled in the casing 10. A groove 25 may be provided at the intersection of surfaces 17 and 16 of block 10. A molding block 23 serves as a support for casing 10 and is provided with a cut-out portion adapted to receive the casing member, the molding block being further provided with machined surfaces, surface 24 adapted to cooperate with surface 16 of casing 10 and surface 26 adapted to fit closely the machined surface 17, so that casing 10 may be aligned with and secured to the molding block 23.

The casing 10 is assembled in the molding block 23 with the surface 17 of the casing making a tight fit with the cooperating surfaces 26 of the molding block and with the upper surface 14 of the casing flush with the top surface of said block. A master rotor 30 and a master shaft or plug 31, either integral therewith or fixed therein, are then disposed in the recess 11 and opening 12 of the casing 10. The diameter of the master rotor 30 is greater than the diameter of the working rotor to be disposed in recess 11 by an amount equal to double the clearance desired between the periphery of the working rotor and the wall 13 of recess 11. The casing 10 is provided with diametrically opposed bosses 32 on the sides thereof, which bosses are provided with openings 33 therein which are ultimately adapted to receive securing bolts for the attachment of a cover plate or another unit to the pump casing. Aligning pins 34 are disposed in the opening 33 to serve as aligning pin for a guide plate member 35. The guide plate 35 is provided with slots 36 adapted to receive the aligning pins 34 and is also provided with a handle 37 and an opening 38 adapted to receive the upper end of the master shaft or plug 31. With the casing member 10, the master rotor 30 and master shaft or plug 31 assembled in the molding block 23, the plate 35 is disposed on the top of the molding block with the opening 38 therein receiving the end of the master shaft 31. The handle member 37 is then forced to the right as viewed in Fig. 1 to bring the master rotor 30 in contact with the peripheral wall 13 of the recess 11. A plunger member 40 is provided with a cut out portion 39 to avoid contacting the master shaft 31. The plunger is lowered against the guide plate 35 to clamp the casing member, the master rotor and master shaft in the assembled positions. The plunger 40 thus clamps the master rotor and shaft in the desired alignment with respect to the casing and recess therein and disposes the shaft 31 in the desired axial positions with respect to the opening 12 which extends longitudinally through the casing member 10.

With the above elements assembled in the positions as set forth, molten bearing material 46 is injected under pressure into the space between the master shaft 31 and the walls of opening 12. To provide for the injection of the bearing material under pressure an opening 41 is provided in the bottom of molding block 23, the opening 41 being in approximate alignment with the opening 12 in the body member 10. A conduit 42 communicates between the space between master shaft 31 and the walls of openings 12 and a cylinder 44 provided with a piston 45 adapted to inject under pressure molten bearing material from a melting pot 47. The conduit 42 is provided with a suitable tip 43 adapted to fit the opening 41 in the bottom of molding block 23. Heating means, such as gas jets 48, may be provided for heating the bearing material 46 contained in the conduit 42 and the melting pot 47. In this manner a bearing 50 may be provided in the opening 12 in casing member 10. This bearing may be of any desired material but preferably is of high leaded bronze. The bearing has a bearing face 51 free from machining or grinding marks, which is in proper alignment with respect to the recess 11 provided for the working rotor to be disposed within the casing 10 and which insures the desired clearance between the working rotor and the casing 10. The bearing member 50 may be broken off at point 52, which is externally of the casing member 10, upon lowering the tip 43 of conduit 42 relative to the casing member 10. The end of bearing 50 may be machined off to provide a surface 53 flush with the end surface of casing member 10. To provide an oil seal for the bearing 50 the casing 10 may be recessed at the outer end of the oil passage 21 and threaded as indicated at 54 to receive an oil connection whereby oil may be applied under pressure from any desired source. One or more oil passages 55 may be drilled through the casing member 10, through the oil passage 22 and through the bearing face 51 of bearing 50. The outer ends of the passages 55 and 22 are plugged as indicated at 56.

Referring particularly to Figs. 5 to 8 inclusive, the method of providing a metal seal type of bearing will be described. In forming this type of bearing the casing member 10 is preformed as before by providing the recess 11 and opening 12 therein and providing the holding and aligning surfaces 14 to 17 as before. In this embodiment, however, the oil hole 22' is extended from the recess 11 and but part way through the length of the body portion of the casing member. A master rotor 30 of the same relative size and form as in the previous embodiment is disposed within the casing member which is mounted in molding block 23. The master rotor 30 is provided with a master shaft 31' which extends but partially through the opening 12. The master rotor 30 has a radius equal to the radius of the working rotor to be employed plus an amount equal to the clearance desired between the working rotor and the casing 10. The master rotor and shaft 30 and 31', are mounted in the casing member 10 and the casing member, in turn, is disposed within the molding block 23 so that the shaft 31' may be positioned by means of the guide plate member 35 and plunger 40 may lock these elements in assembled positions as before. In the present instance the bearing is formed in two parts. In forming the upper bearing member 62, a different type of nozzle or tip, designated 60, is provided which extends upwardly into the opening 12 a distance preferably slightly more than half way through the opening, and molten bearing material is forced into the space between the shaft 31' and the opening 12 to provide the bearing 62. The end of the bearing 62 is broken away by withdrawing the nozzle member 60. The end of the bearing 62 is then machined to provide a relatively sharp annular edge as indicated at 63. The plunger 40 and guide plate member 35 are then lifted and the master rotor 30 and shaft 31' are removed and replaced by the working rotor 67 and working shaft 65 which are clamped in adjusted position by means of the guide plate 35 and plunger 40. It is noted that the bearing 62 now aligns the shaft and working rotor in the position desired. A collar 66 which makes a drive or press fit with a shaft 65 is mounted thereon so that the shaft and rotor have a slight amount of play on either side of the bearing 62. The shaft is provided with a groove 67 in which a split ring 68 is disposed to lock the collar 66 in position. A coil spring 70 is disposed about the rotor shaft 65 and is held in compressed condition between a washer 71 and a collar member 66 by a second split ring 72 disposed in a groove 73 provided in the casing member 10. A fiber washer 74 is then placed against the split ring so that the assembly is now in condition so that the second or lower bearing member 82 may be formed. In pouring the bearing material 46 for bearing 82, the conduit 42 having the tip 43 is disposed in the opening 41 in the block 23 and molten bearing material 46 is injected under pressure to provide a lower bearing 82. Upon cooling, the end of this bearing is broken away externally of the casing member in the same manner as in the first embodiment. The casing member 10 is then removed from the molding block 23 and the end surface of bearing 82 is machined until it presents an end surface 81 flush with the end surface of the casing member 10. A single oil passage 80 is then drilled through the casing member 10 connecting with the oil passage 22' and projecting through the bearing surface 83 of the bearing member 82 at a point adjacent the coil spring 70 to lubricate the contacting surfaces of the collar 66 and bearing 62 and to provide lubrication for the shaft 65 as it rotates in the bearings 62 and 82.

As many changes could be made in the above described arrangement and many apparently widely different embodiments of this invention could be made without departing from the scope thereof, it is intended that all matter contained in the above description or showing will be interpreted as illustrative and not in the limiting sense.

What is claimed is:

1. In the manufacture of a rotary pump having a casing provided with a cylindrical rotor recess and an inlet and outlet leading to and from the recess, a drive shaft excentric to said recess and a cylindrical working rotor in said recess secured to said shaft in concentric relation with respect thereto; the method of producing a bearing for said shaft in said casing comprising forming a master rotor and shaft assembly, the master rotor being of slightly larger diameter than the diameter of the working rotor to be finally assembled in said pump, placing said master rotor and shaft in said casing with said master rotor received in said recess, locating the axis of the master shaft in a plane approximately including the axis of said recess and passing between said inlet and outlet, pressing said master rotor against the wall of said recess between said inlet and outlet, introducing bearing material into the space between said shaft and casing adjacent the master rotor and but for a part only of the length of said casing to provide a bearing, removing said master rotor and shaft, machining that end of said cast bearing metal more remote from said recess, inserting a working rotor and shaft in said casing in place of said master rotor and shaft, placing a collar on said working shaft adjacent the machined end of said cast metal, locking a spring in compressed position between said casing and said collar, sealing the space between the outer end of said spring and said casing, and introducing bearing metal into the space between said working shaft and casing outwardly from said seal to form a second bearing.

2. In the manufacture of a rotary pump having a casing provided with a cylindrical rotor recess and an inlet and outlet leading to and from the recess, a drive shaft excentric with said recess and a cylindrical working rotor in said recess secured to said shaft in concentric relation with respect thereto; the method of producing a bearing for said shaft in said casing comprising forming a master rotor and shaft assembly, placing said master rotor and shaft in said casing with said master rotor received in said recess and with the axis of the master shaft located in the plane including the axis of the recess and passing between the inlet and outlet, pressing said master rotor against the wall of said recess between said inlet and outlet, casting metal between said master shaft and rotor for a portion only of the concurrent length of said shaft and casing and at the recess end thereof only to form a bearing, removing said master shaft and rotor and replacing it by a working shaft and rotor, applying a mechanical seal about said shaft within said casing and adjacent said bearing, and then casting additional metal between said casing and said working shaft to form a bearing between said seal and the end of said casing more remote from said recess.

EARL W. DILG.